US008798455B2

(12) United States Patent
Frankel

(10) Patent No.: US 8,798,455 B2
(45) Date of Patent: Aug. 5, 2014

(54) SECURE FIBER OPTIC COMMUNICATION SYSTEMS AND METHODS

(75) Inventor: Michael Y. Frankel, Linthicum, MD (US)

(73) Assignee: Ciena Corporation, Hanover, MD (US)

(*) Notice: Subject to any disclaimer, the term of this patent is extended or adjusted under 35 U.S.C. 154(b) by 477 days.

(21) Appl. No.: 12/768,808

(22) Filed: Apr. 28, 2010

(65) Prior Publication Data

US 2011/0268436 A1    Nov. 3, 2011

(51) Int. Cl.
*H04B 17/00* (2006.01)
*G02B 6/00* (2006.01)
*G02B 6/26* (2006.01)

(52) U.S. Cl.
USPC ............ 398/9; 398/1; 398/40; 398/79; 726/4; 726/23; 340/555; 340/540

(58) Field of Classification Search
USPC ......................................................... 398/9, 1
See application file for complete search history.

(56) References Cited

U.S. PATENT DOCUMENTS

| | | | | |
|---|---|---|---|---|
| 5,920,414 | A * | 7/1999 | Miyachi et al. ............ | 398/14 |
| 2002/0131106 | A1* | 9/2002 | Snawerdt ................. | 359/124 |
| 2002/0131115 | A1* | 9/2002 | Kasahara ................. | 359/124 |
| 2006/0198017 | A1* | 9/2006 | Inagaki et al. ............ | 359/337 |
| 2008/0018884 | A1* | 1/2008 | Butler et al. ............. | 356/73.1 |
| 2008/0138023 | A1* | 6/2008 | Williams et al. .......... | 385/125 |

OTHER PUBLICATIONS

Maksim Skorobogatiy, Kunimasa Saitoh, Masanori Koshiba; "Resonant directional coupling of hollow Bragg fibers"; Optics Letters / vol. 29, No. 18, Sep. 15, 2004; (c) 2001 Optical Society of America.
M. Skorobogatiy, Kunimasa Saitoh, and Masanori Koshiba; "Hollow Bragg fiber bundles: when coupling helps and when it hurts"; Photonics North 2004; Optical Components and Devices, edited by John C. Armitage; Proceedings of SPIE vol. 5577 (SPIE, Bellingham, WA, 2004.
Maksim Skorobogatiy, Kunimasa Saitoh, and Masanori Koshiba; "Directional coupling in hollow Bragg fiber bundles"; (c) 2004 Optical Society of America.
Mattco Foroni, Davide Passaro, Federica Poli, Annamaria Cucinotta, Stefano Selleri, Jesper Lagsgaard, and Anders O. Bjarklev; "Guiding Properties of Silica/Air Hollow-Core Bragg Fibers"; Journal of Lightwave Technology, vol. 26, No. 13, Jul. 1, 2008.

* cited by examiner

*Primary Examiner* — Oommen Jacob
(74) *Attorney, Agent, or Firm* — Clements Bernard PLLC; Christopher L. Bernard; Lawrence A. Baratta, Jr.

(57) ABSTRACT

The present disclosure relates to fiber optic networks carrying sensitive information such as classified government communications, sensitive financial information, proprietary corporate information, and associated systems and methods for secure transmission where fiber tampering is easily detected. The present invention provides improved security systems and methods for fiber optic communication links. Specifically, a hollow-core photonic bandgap fiber is deployed as a transmission medium. A secure fiber optic communication link is established over the hollow-core photonic bandgap fiber with a monitoring mechanism. The monitoring mechanism is configured to detect large losses and large spectral variability each indicative of loss introduced by malicious intrusion attempts. Further, the monitoring mechanism allows easy differentiation of intrusion relative to normal system variations thereby reducing false positives and missed intrusions.

20 Claims, 2 Drawing Sheets

SECURE FIBER OPTIC COMMUNICATION SYSTEMS AND METHODS

FIELD OF THE INVENTION

The present invention relates generally to fiber optical communication networks. More particularly, the present invention relates to fiber optic networks carrying sensitive information such as classified government communications, sensitive financial information, proprietary corporate information, and associated systems and methods for secure transmission where fiber tampering is easily detected.

BACKGROUND OF THE INVENTION

Conventionally, fiber optic links use fibers that rely on total internal reflection for confinement of an optical propagation mode. Therefore, the structure of the fibers uses a high refractive index core of approximately five to one hundred microns in diameter, surrounded by a low refractive index cladding. The cladding is present mostly to provide mechanical stability to the fibers. Thus, in a conventional fiber, if the cladding is removed, light is still confined to the high index core suffering very little loss since the surrounding air also has a very low refractive index. Disadvantageously, a conventional fiber optic link can be tapped into quite easily. For example, the fiber may be exposed from its cable, removing an outer polymer protective coating. The glass cladding layer may be thinned via mechanical or chemical methods. A second strand of fiber with removed cladding may be brought in close proximity to the fiber being tapped, and a small fraction of light will be coupled out of the tapped fiber into the second strand. While the light coupled out reduces transmitted light intensity in the tapped fiber, the coupling loss may be extremely small such as on the order of one percent or less. Here, an intruder may monitor the coupled out light. Conversely, the intruder may inject parasitic light into the tapped fiber to disrupt or spoof existing optical carriers. This small one percent or less loss induced in the transmitted light is easily obscured by natural optical power variations associated with thermal and mechanical stresses, optical amplifier noise, etc. Therefore, network operators and end users may be completely unaware of a compromised link.

Conventional fiber security includes various systems and methods. First, optical signal light intensity may be monitored for decreases in power (e.g., one percent or less). Unfortunately, this method has limited resolution capability as intrusion events may be easily obscured by natural system mechanical and thermal perturbations, optical amplifier noise, etc. Thus, low alarm threshold settings will produce many false positives whereas high alarm threshold settings will miss intrusion events. Second, an external probe light may be injected into a fiber optic link. This probe may be conditioned to be less sensitive to natural system perturbations. Disadvantageously, the probe solution requires a large amount of dedicated hardware with a separate deployment required for each segment of a large network. Third, quantum key distribution may be used as a secure communication method. Such a system is very complex and provides only extremely slow kilobit rate communications over short distances (tens of kilometers). Thus, it is only suitable for distributing encoding information (i.e., keys) and not for carrying actual data. Finally, fiber-based strain sensors, such as ones based on Brillouin optical time domain analysis, may be used for intrusion detection. Glass material strain induces a frequency shift in light backscattered by the Brillouin effect allowing for identification of induced fiber strain location. However, this method only indicates that a fiber is being mechanically handled and may provide false alarms in cases where fiber is not mechanically isolated (e.g., aerial cables, subway ducts, etc.).

BRIEF SUMMARY OF THE INVENTION

In various exemplary embodiments, the present invention relates to fiber optic networks carrying sensitive information such as classified government communications, sensitive financial information, proprietary corporate information, and associated systems and methods for secure transmission where fiber tampering is easily detected. The present invention provides improved security systems and methods for fiber optic communication links. Specifically, a hollow-core photonic bandgap fiber is deployed as a transmission medium. A secure fiber optic communication link is established over the hollow-core photonic bandgap fiber with a monitoring mechanism. The monitoring mechanism is configured to detect large losses and large spectral variability, each indicative of loss introduced by malicious tapping attempts. Further, the monitoring mechanism allows easy differentiation of intrusion relative to normal system variations thereby reducing false positives and missed intrusions.

In an exemplary embodiment, a secure fiber optic system includes one or more transmitters; one or more receivers, wherein each of the one or more receivers is coupled to a corresponding transmitter of the one or more transmitters over a hollow core photonic bandgap fiber optic link; and a detector coupled to each of the one or more receivers, wherein the detector is configured to detect intrusions to the hollow core photonic bandgap fiber optic link. The detector is configured to monitor optical power from each of the one or more receivers and to detect the intrusions responsive to the monitored optical power. The detector is configured to detect the intrusions responsive to optical power for one of the one or more receivers changing by a power threshold. The detector is configured to detect the intrusions responsive to spectral differentiation of power thresholds based on different wavelengths associated with each of the one or more receivers. Optionally, the secure fiber optic system further includes a multiplexer configured to multiplex a wavelength associated with each of the one or more transmitter into a single signal for transmission over the hollow core photonic bandgap fiber optic link; and a demultiplexer configured to demultiplex each of the wavelengths from the hollow core photonic bandgap fiber optic link for each of the one or more receivers. The secure fiber optic system may further include one or more optical amplifiers interconnected in the hollow core photonic bandgap fiber optic link between the one or more transmitters and the one or more receivers. The detector is configured to raise an alarm responsive to detecting an intrusion. The detector is configured to prevent transmission of secure information from any of the one or more transmitters to the one or more receivers responsive to detecting an intrusion. Optionally, the one or more transmitters are disposed in a first node; wherein the one or more receivers are disposed in a second node; and wherein the detector is disposed in the second node. The detector may be included in a control module in the second node.

In another exemplary embodiment, a secure optical node includes one or more optical receivers, wherein each of the one or more optical receivers is coupled to a corresponding optical transmitter over a hollow core photonic bandgap fiber optic link; a detector coupled to each of the one or more receivers, wherein the detector is configured to detect intrusions to the hollow core photonic bandgap fiber optic link;

and a communications link to each of the corresponding optical transmitters and a network management system. The detector is configured to monitor optical power from each of the one or more receivers and to detect the intrusions responsive to the monitored optical power. The detector is configured to detect the intrusions responsive to optical power for one of the one or more receivers changing by a low power threshold. The detector is configured to detect the intrusions responsive to spectral differentiation of power thresholds based on different wavelengths associated with each of the one or more receivers. The secure optical node further includes a demultiplexer receiving an optical signal from the hollow core photonic bandgap fiber optic link and providing an optical wavelength to each of the one or more receivers. The secure optical node further includes one or more optical amplifiers interconnected in the hollow core photonic bandgap fiber optic link. The detector is configured to raise an alarm to the network management system responsive to detecting an intrusion. The detector is configured to prevent transmission of secure information to the one or more receivers responsive to detecting an intrusion through signaling over the communications link. Optionally, the detector is included in a control module.

In yet another exemplary embodiment, a method of secure optical communications includes receiving one or more wavelengths from one or more optical spans, each of the one or more optical spans including hollow core photonic bandgap fiber; monitoring optical power associated with each of the one or more wavelengths; detecting a loss change in the optical power associated with each of the one or more wavelengths; detecting differences in loss changes experienced at different wavelengths; and determining an intrusion responsive to the detected loss changes and the detected differences in loss changes.

BRIEF DESCRIPTION OF THE DRAWINGS

The present invention is illustrated and described herein with reference to the various drawings of exemplary embodiments, in which like reference numbers denote like system components, respectively, and in which.

DETAILED DESCRIPTION OF THE INVENTION

In various exemplary embodiments, the present invention relates to fiber optic networks carrying sensitive information such as classified government communications, sensitive financial information, proprietary corporate information, and associated systems and methods for secure transmission where fiber tampering is easily detected. The present invention provides improved security systems and methods for fiber optic communication links. Specifically, a hollow-core photonic bandgap fiber (HC-PBF) is deployed as a transmission medium. A secure fiber optic communication link is established over the hollow-core photonic bandgap fiber with a monitoring system and method. The monitoring system and method is configured to detect large losses and large spectral variability between wavelengths, each indicative of loss introduced by malicious tapping attempts, i.e. intrusions. Further, the monitoring system and method allow easy differentiation of intrusion relative to normal system variations thereby reducing false positives and missed intrusions.

Figure 1:
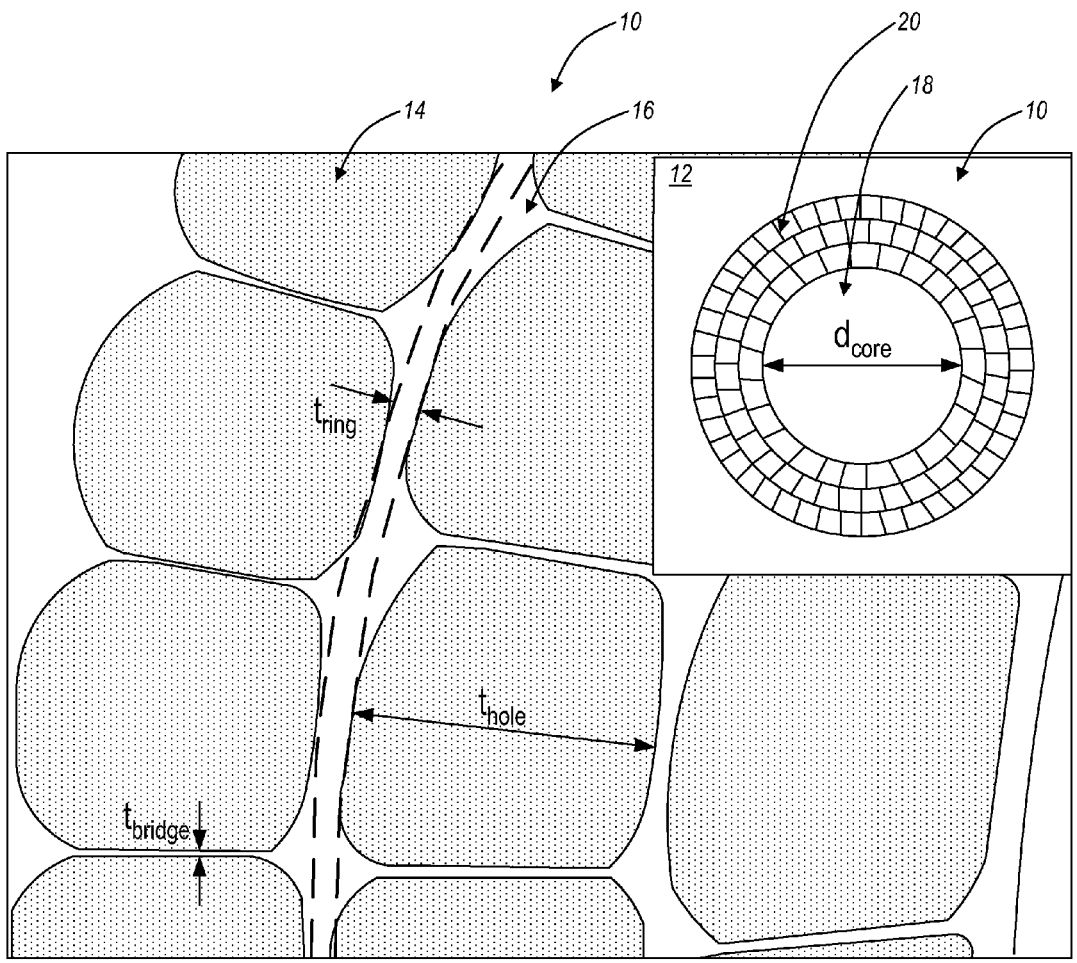
FIG. 1 is a cross sectional diagram of Hollow-Core Photonic Bandgap Fiber (HC-PBF)

Referring to FIG. 1, in an exemplary embodiment, a cross sectional diagram illustrates a close up view of Hollow-Core Photonic Bandgap Fiber (HC-PBF) 10. An inset diagram 12 illustrates a full cross sectional diagram of the HC-PBF 10. The last several years have seen a very rapid development of a new class of optical fiber, such as the HC-PBF 10. Note, the HC-PBF 10 may be referred to as Hollow Core Fiber, Photonic Bandgap Fiber, Photonic Crystal Fiber, or the like. The HC-PBF 10 has a radically different structure and a different optical guiding principle from conventional fiber. FIG. 1 illustrates a typical structure of the exemplary HC-PBF 10. Specifically, the HC-PBF 10 includes various regions 14 of air surrounded by glass 16. As the name implies, the HC-PBF 10 has a hollow core 18 such that optical light is guided mostly in the air-filled center region, i.e. the hollow core 18. The light is confined to the hollow core 18 by surrounding the hollow core 18 with a periodic lattice 20 of additional holes in the glass 16, such that the lattice 20 forms a resonantly reflective structure. This is similar to a stack of layers in a thin-film filter which reflects a specific portion of the spectrum defined by layers' index of refraction and periodicity. Only the light spectrum that satisfies the reflective periodicity of the cladding lattice 20 can propagate in the HC-PBF 10.

With proper engineering, the HC-PBF 10 can maintain good propagation properties over a large range of wavelengths, including ones used in conventional telecommunication window of 1525 to 1565 nm. In the example of FIG. 1, the lattice 20 includes three concentric cylindrical glass rings surrounding the hollow core 18 with a diameter $d_{core}$. The glass 16 includes a thickness of $t_{ring}$, separated by the air regions 14 with a width of $t_{holes}$ and connected by glass bridges $t_{bridge}$ wide. It should also be noted that since light is guided mostly in air in the hollow core 18, this type of fiber is not constrained by the low loss properties of the glass material, but may be engineered for wide range of wavelengths. For example, FIG. 1 is taken from Foroni et al., "Guiding properties of silica/air hollow core Bragg fibers," J. Lightwave Techn., vol. 23, no. 14, July 2008, pp. 1877-1884.

There are four primary motivations that have been discussed in literature for designing and using the HC-PBF 10. First, light sees only a very low index of refraction, associated with approximately 99% air propagation in the hollow core 18. Therefore, optical time of flight delay is much lower compared to conventional glass-core fibers. Second, the non-linear effects associated with propagation in glass are largely eliminated, supporting higher optical power propagation. Third, fiber may be designed to support a wide range of wavelengths with theoretically low loss, without constraints imposed by the glass material loss properties. Fourth, the HC-PBF 10 may be conveniently used as a sensor, whereby sampled substance is introduced into the hollow core providing a large interaction length with the probe light.

In various exemplary embodiments, the present invention utilizes a property associated with the HC-PBF 10 structure that it is very difficult to couple to the HC-PBF 10 without a severe disturbance of the main guided mode. Since light confinement in the hollow core 18 relies on a precise bandgap structure of the cladding, any change to the cladding severely disrupts the main propagation mode. The present invention utilizes this property to provide a secure optical link that may detect intrusions. Specifically, a partial coupling from the HC-PBF 10 to conventional fiber via proximity tangential coupling is not possible, since it would require light transition from a low index material into a high index material. Further, more sophisticated couplers based on two adjacent HC-PBF structures have been considered (see, e.g., M. Skorobagatiy et al., "Directional coupling in hollow Bragg fiber bundles," Optical Fiber Communication Digest, OFC 2005, paper OTuI3.) However, these more sophisticated couplers still induce a very large perturbation to the main propagation mode prior to the contact. Further, the coupling coefficient and main mode losses show very strong spectral features due to the resonances in the two closely coupled Bragg structures. This is in contrast to conventional fiber couplers which generally exhibit very broadband spectrally-independent coupling properties.

Figure 2:
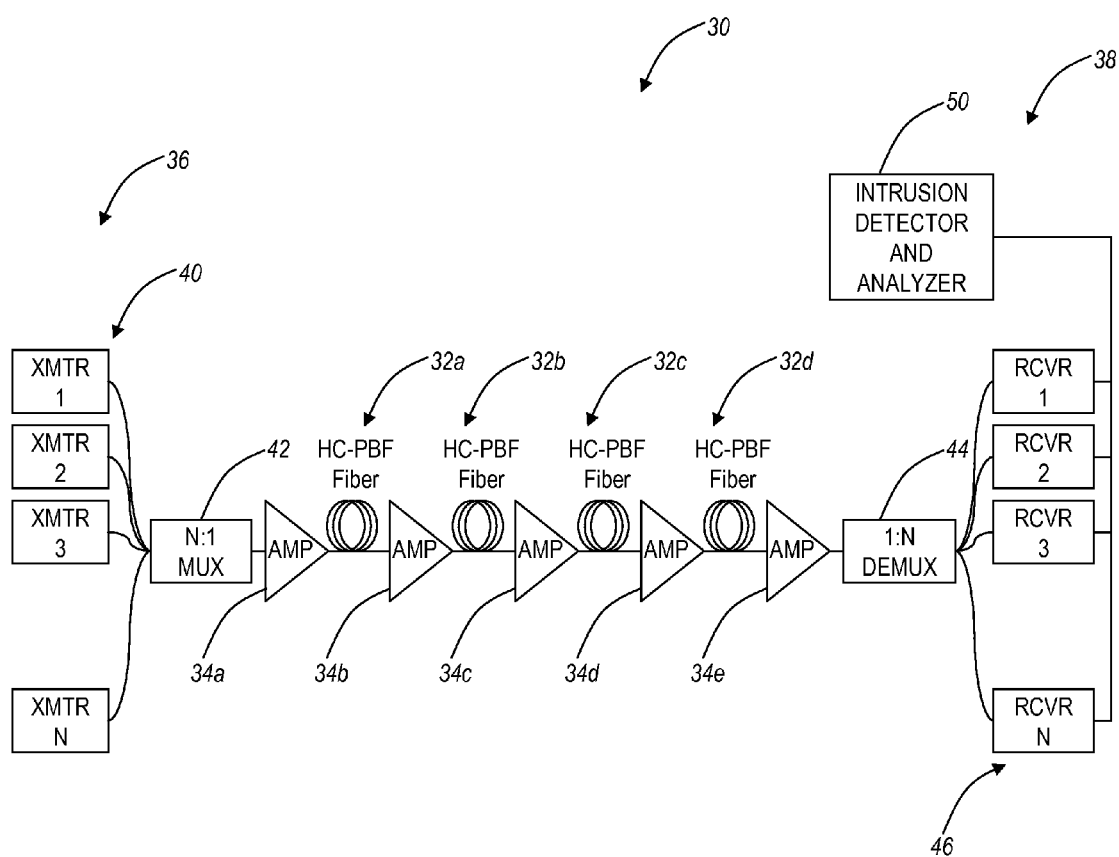
FIG. 2 is a network diagram of a secure fiber optic communication system utilizing Hollow-Core Photonic Bandgap Fiber (HC-PBF) according to an exemplary embodiment of the present invention.

Referring to FIG. 2, in an exemplary embodiment, a secure fiber optic communication system 30 is illustrated according to the present invention. The secure fiber optic communication system 30 utilizes HC-PBF fiber 32 as a transmission medium. Depending on application, the communication system 30 may have optical amplifiers 34 to extend the reach and overcome HC-PBF losses. For example, FIG. 2 is illustrated with four optical spans 32a, 32b, 32c, 32d each with HC-PBF fiber and with five optical amplifiers 34a, 34b, 34c, 34d, 34e. The optical amplifiers 34 may include erbium doped fiber amplifiers (EDFA) or the like. Of note, the present invention is configured to operate a secure link over an optical span. As described herein, FIG. 2 is illustrated with four optical spans. Those of ordinary skill in the art will recognize the systems and methods of the present invention contemplate a single, point-to-point span to any arbitrary number of spans with intermediate optical amplifiers 34. Further, the present invention may operate with optical regenerators (2R/3R, etc.) with each span defined as transmitter to receiver.

The secure fiber optic communication system 30 includes two nodes 36, 38 with optical-electrical conversion for accessing information. Specifically, the secure fiber optic communication system 30 is illustrated in a uni-directional configuration with a plurality of transmitters 40 at the first node 36 transmitting via a 1:N multiplexer 42 to a post amplifier, i.e. the optical amplifier 34a, to the second node 38 over the four optical spans 32a, 32b, 32c, 32d. Each of the plurality of transmitters 40 is configured to transmit a different optical wavelength modulated with data. For example, this may include dense wave division multiplexed (DWDM) transmission, e.g. between 1525 to 1565 nm. The plurality of transmitters 40 may be transponders, transceivers, etc. that are integrated into a DWDM platform, data switch or router, optical switch, cross connect, metro DWDM platform, coarse WDM (CWDM) platform, or the like. The 1:N multiplexer 42 is configured to receive the different optical wavelength from each of the plurality of transmitters 40 and to combine these onto a single output to the optical amplifier 34a. Thus, each of the optical wavelengths from the plurality of transmitters 40 is transmitted across the four spans 32a, 32b, 32c, 32d.

The four spans 32a, 32b, 32c, 32d are defined by the inline optical amplifiers 34b, 34c, 34d, i.e. located at intermediate sites along a fiber route of the four optical spans 32a, 32b, 32c, 32d. At the second node 38, a pre amplifier, i.e. the optical amplifier 34e, may receive the optical wavelengths and perform amplification prior to sending all of the optical wavelengths to a 1:N demultiplexer 44. The 1:N demultiplexer 44 is configured to split each of the optical wavelengths from each of the plurality of transmitters 40 back into a separate signal and to send each of these to an appropriate receiver of a plurality of receivers 46. Note, the present invention is configured to operate on a single optical span, i.e. transmitter 40 to receiver 46, over the HC-PBF fiber spans 32. Those of ordinary skill in the art will recognize that the node 36 may have a similar configuration as the node 38 for a bi-directional link. Further, the present invention may also operate without wavelength division multiplexing (WDM), i.e. using a single wavelength. Also, the present invention may operate with other WDM schemes such as CWDM, etc.

The present invention contemplates operation with any type of optical communication system. For example, most deployed systems utilize traditional non-return-to-zero (NRZ) transmission with on-off keying. In addition, the present invention may support newly developed optical coherent receivers that include Digital Signal Processing (DSP) for frequency and phase locking, and for mitigating very large amounts of chromatic and polarization mode dispersion. Such coherent receivers provide a convenient way of compensating for chromatic dispersion and modal coupling that may be induced in the HC-PBF optical spans 32.

The secure fiber optic communication system 30 includes an intrusion detector and analyzer 50 coupled to each of the plurality of receivers 46. The detector and analyzer 50 is configured to monitor optical signal power from each of the plurality of receivers 46. Through this monitoring, the detector and analyzer 50 is able to detect intrusions in the secure fiber optic communication system 30. For example, the detector and analyzer 50 may be configured to raise an alarm such as with a network management system (NMS), element management system (EMS), or the like upon detecting an intrusion. Also, the detector and analyzer 50 may be configured to signal the plurality of transmitters 40 to stop transmission based upon detecting an intrusion, such as via an optical service channel, SONET/SDH overhead, Optical Transport Network (OTN) overhead, and the like. For example, the secure fiber optic communication system 30 may use intrusion detection alarms to suspend sensitive data transmission until the cause of the alarm is located and eliminated.

Thus, the present invention contemplates any optical transmission system, one or more HC-PBF fiber spans 32, and the detector and analyzer 50 collectively operating a secure link in a natural fashion. Specifically, the detector and analyzer 50 is configured to easily detect any intrusions to the one or more HC-PBF fiber spans 32 since malicious tapping or coupling attempts induce much larger losses than natural system perturbations. Specifically, the present invention contemplates operation over the one or more HC-PBF fiber spans 32. For example, the detector and analyzer 50 includes a loss change threshold for monitoring each optical signal power from each of the plurality of transmitters 40. Intrusion alarms are set at the loss change threshold that allows intrusion detections, while avoiding false alarms. Note, the loss change threshold may be predetermined, manually set, or automatically set by the secure fiber optic communication system 30. Further, the loss change threshold may be different for different wavelengths.

In another exemplary embodiment, the detector and analyzer 50 may provide further improvement monitoring spectral differentiation of loss based on individual wavelengths. Of note, sharp spectral features indicate that intrusions induce a very large difference in the loss experience by channels at different optical wavelengths in the secure fiber optic communication system 30. Adding an additional alarm based on relative loss changes experienced by different wavelengths may further improve intrusion detection and false alarm rejection.

In an exemplary embodiment, the detector and analyzer 50 may be implemented or realized with any of a general purpose processor or collection of processors, a content addressable memory, a digital signal processor (DSP), an application specific integrated circuit (ASIC), a field programmable gate array (FPGA), any suitable programmable logic device (PLD), discrete gate or transistor logic, discrete hardware components, or any combination thereof, designed to perform the functions described herein. The detector and analyzer 50 may be integrated within one of the receivers 46 or be separate. In one exemplary embodiment, the detector and analyzer 50 may be part of a control module associated with a network element housing the receivers 46. For example, in a typical WDM system, the control module may be configured to receiver real-time power measurements associated with each of the receivers 46. Here, the detector and analyzer 50 may include software, firmware, logic, etc. configured to continuously monitor these real-time power measurements and detect threshold changes and spectral differentiation of loss.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A secure fiber optic system, comprising:
   one or more transmitters;
   one or more receivers, wherein each of the one or more receivers is coupled to a corresponding transmitter of the one or more transmitters over a hollow core photonic bandgap fiber optic link; and
   a detector coupled to each of the one or more receivers, wherein the detector is configured to detect intrusions to the hollow core photonic bandgap fiber optic link utilizing a power threshold that is based on a characteristic of the hollow core photonic bandgap fiber optic link, wherein hollow core photonic bandgap fiber is configured to provide larger losses and spectral variability between wavelengths due to the intrusions than natural system perturbations relative to conventional fiber;
   wherein the detector one or more of: (1) utilizes a plurality of different thresholds for a plurality of different wavelengths and (2) utilizes a relative threshold for a plurality of different wavelengths, wherein the intrusions are further detected based on detecting a difference in loss experienced by channels at the different wavelengths due to a suspected intrusion.

2. The secure fiber optic system of claim 1, wherein the detector is configured to monitor optical power from each of the one or more receivers and to detect the intrusions responsive to the monitored optical power.

3. The secure fiber optic system of claim 2, wherein the detector is further configured to detect the intrusions responsive to optical power for one of the one or more receivers changing by the power threshold.

4. The secure fiber optic system of claim 3, wherein the detector is configured to detect the intrusions responsive to spectral differentiation of power based on different wavelengths associated with each of the one or more receivers.

5. The secure fiber optic system of claim 1, further comprising:
   a multiplexer configured to multiplex a wavelength associated with each of the one or more transmitter into a single signal for transmission over the hollow core photonic bandgap fiber optic link; and
   a demultiplexer configured to demultiplex each of the wavelengths from the hollow core photonic bandgap fiber optic link for each of the one or more receivers.

6. The secure fiber optic system of claim 5, further comprising:
   one or more optical amplifiers interconnected in the hollow core photonic bandgap fiber optic link between the one or more transmitters and the one or more receivers.

7. The secure fiber optic system of claim 1, wherein the detector is configured to raise an alarm responsive to detecting an intrusion.

8. The secure fiber optic system of claim 1, wherein the detector is configured to prevent transmission of secure information from any of the one or more transmitters to the one or more receivers responsive to detecting an intrusion.

9. The secure fiber optic system of claim 1, wherein the one or more transmitters are disposed in a first node;
   wherein the one or more receivers are disposed in a second node; and
   wherein the detector is disposed in the second node.

10. The secure fiber optic system of claim 9, wherein the detector is included in a control module in the second node.

11. A secure optical node, comprising:
    one or more optical receivers, wherein each of the one or more optical receivers is coupled to a corresponding optical transmitter over a hollow core photonic bandgap fiber optic link;
    a detector coupled to each of the one or more receivers, wherein the detector is configured to detect intrusions to the hollow core photonic bandgap fiber optic link utilizing a power threshold that is based on a characteristic of the hollow core photonic bandgap fiber optic link, wherein hollow core photonic bandgap fiber is configured to provide larger losses and spectral variability between wavelengths due to the intrusions than natural system perturbations relative to conventional fiber; and
    a communications link to each of the corresponding optical transmitters and a network management system;
    wherein the detector one or more of: (1) utilizes a plurality of different thresholds for a plurality of different wavelengths and (2) utilizes a relative threshold for a plurality of different wavelengths, wherein the intrusions are further detected based on detecting a difference in loss experienced by channels at the different wavelengths due to a suspected intrusion.

12. The secure optical node of claim 11, wherein the detector is configured to monitor optical power from each of the one or more receivers and to detect the intrusions responsive to the monitored optical power.

13. The secure optical node of claim 12, wherein the detector is further configured to detect the intrusions responsive to optical power for one of the one or more receivers changing by the power threshold.

14. The secure optical node of claim 13, wherein the detector is configured to detect the intrusions responsive to spectral differentiation of low based on different wavelengths associated with each of the one or more receivers.

15. The secure optical node of claim 11, further comprising:
    a demultiplexer receiving an optical signal from the hollow core photonic bandgap fiber optic link and providing an optical wavelength to each of the one or more receivers.

16. The secure optical node of claim 15, further comprising:
    one or more optical amplifiers interconnected in the hollow core photonic bandgap fiber optic link.

17. The secure optical node of claim 11, wherein the detector is configured to raise an alarm to the network management system responsive to detecting an intrusion.

18. The secure optical node of claim 11, wherein the detector is configured to prevent transmission of secure information to the one or more receivers responsive to detecting an intrusion through signaling over the communications link.

19. The secure fiber optic system of claim 11, wherein the detector is included in a control module.

20. A method of secure optical communications, comprising:
   receiving one or more wavelengths from one or more optical spans, each of the one or more optical spans comprising hollow core photonic bandgap fiber;
   monitoring optical power associated with each of the one or more wavelengths;
   detecting a loss change in the optical power associated with each of the one or more wavelengths;
   detecting differences in loss changes experienced at different wavelengths of the one or more wavelengths; and
   determining an intrusion responsive to the detected loss changes and the detected differences in loss changes;
   wherein a power threshold that is based on a characteristic of the hollow core photonic bandgap fiber optic link is utilized in the detecting and determining steps, wherein hollow core photonic bandgap fiber is configured to provide larger losses and spectral variability between wavelengths for the secure optical communications method due to the intrusions than natural system perturbations relative to conventional fiber; and
   wherein the detector one or more of: (1) utilizes a plurality of different thresholds for a plurality of different wavelengths and (2) utilizes a relative threshold for a plurality of different wavelengths, wherein the intrusions are further detected based on detecting a difference in loss experienced by channels at the different wavelengths due to a suspected intrusion.

* * * * *